United States Patent
Tasic et al.

(10) Patent No.: US 7,899,426 B2
(45) Date of Patent: Mar. 1, 2011

(54) DEGENERATED PASSIVE MIXER IN SAW-LESS RECEIVER

(75) Inventors: Aleksandar Tasic, San Diego, CA (US); Junxiong Deng, San Diego, CA (US); Namsoo Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 554 days.

(21) Appl. No.: 11/936,305

(22) Filed: Nov. 7, 2007

(65) Prior Publication Data

US 2009/0111420 A1 Apr. 30, 2009

Related U.S. Application Data

(60) Provisional application No. 60/983,874, filed on Oct. 30, 2007.

(51) Int. Cl.
*H04B 7/00* (2006.01)
*H04B 1/16* (2006.01)
(52) U.S. Cl. .................. 455/286; 455/334; 455/550.1
(58) Field of Classification Search .............. 455/550.1, 455/334, 213, 286, 307, 313, 285
See application file for complete search history.

(56) References Cited

U.S. PATENT DOCUMENTS

| | | | | |
|---|---|---|---|---|
| 7,457,605 | B2 * | 11/2008 | Thompson et al. | 455/313 |
| 7,460,844 | B2 * | 12/2008 | Molnar et al. | 455/130 |
| 7,468,629 | B2 * | 12/2008 | Chien | 327/553 |
| 2009/0239592 | A1 * | 9/2009 | Deng et al. | 455/574 |
| 2009/0252252 | A1 * | 10/2009 | Kim et al. | 375/268 |
| 2010/0029323 | A1 * | 2/2010 | Tasic et al. | 455/550.1 |

OTHER PUBLICATIONS

Bagheri, Rahim, "An 800-Mhz-6-Ghz Software-Defined Wireless Receiver in 90-nm CMOS," IEEE Journal of Solid-State Circuits, vol. 41, No. 12, Dec. 2006.
Wan, Jiansong, "Tunable Bandpass (1.7-6)GHz Polyphase Filter in Near Zero IF Receiver, " Philips, July 2007.
Zhu, Yide, "Harmonic Rejection Mixer for Digital Video Broadcase—Handheld," Thesis, Delft University of Technology, Jun. 2007.
Nguyen et al., "A Low-Power RF Direct-Conversion Receiver/Transmitter for 2.4-GHz-Band IEEE 802.15.4 Standard in 0.18-µm CMOS Technology," vol. 54, No. 12, Dec. 2006, pp. 4062-4071.
Circa et al., "Resistive MOSFET mixer for mobile direct conversion receivers, XP010687639 ISBN: 978-0-7803-7824-7, "Microwave and Optoelectronics Conference, Proceedings of the SBMO/IEEE MTT-S International, Piscataway, NJ, USA, IEEE, US, 2003, 3, 59-64.
Kim et al., "A resistively degenerated wide-band passive mixer with low noise figure and +60dBm IIP2 in 0.18βm CMOS, 2008 RFIC 2008, IEEE Piscataway, NJ, US, ISBN: 978-1-4244-1808-4, "Radio Frequency Integrated Circuits Symposium, 2008, 185-188.

(Continued)

*Primary Examiner* — Sonny Trinh
(74) *Attorney, Agent, or Firm* — Jiayu Xu

(57) ABSTRACT

In a SAW-less receiver involving a passive mixer, novel degenerative impedance elements having substantial impedances are disposed in incoming signal paths between the differential signal output leads of a low-noise amplifier (LNA) and the differential signal input leads of the passive mixer. The passive mixer outputs signals to a transimpedance amplifier and baseband filter (TIA). Providing the novel degenerative impedance elements decreases noise in the overall receiver as output from the TIA, with only minimal degradation of other receiver performance characteristics. In some examples, the passive mixer receives local oscillator signals having duty cycles of substantially less than fifty percent. In some examples, the degenerative impedance elements can have one of several impedances.

25 Claims, 7 Drawing Sheets

OTHER PUBLICATIONS

Razavi et al., "Multiband UMB transceivers," Proceedings of the IEEE 2005, IEEE, Piscataway, NJ, USA, XP010873764 ISBN: 978-0-7803-9023-2 he whole document, Custom Integrated Circuits Conference, 2005, 140-148.

International Search Report and Written Opinion-PCT/US08/081652, International Searching Authority-European Patent Office, Apr. 2, 2009.

* cited by examiner

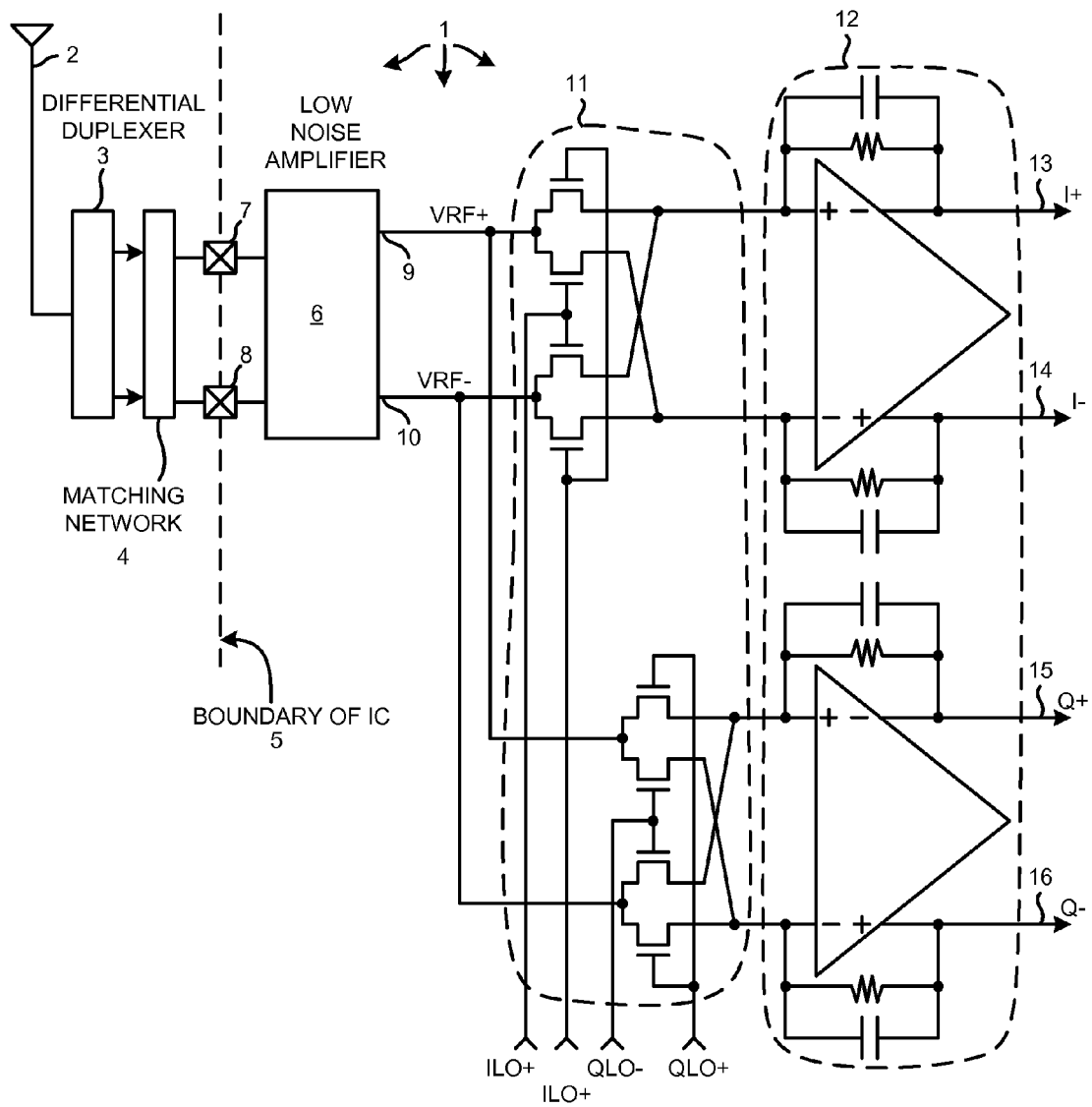
| PERFORMANCE CHARACTERISTIC | VALUE |
|---|---|
| NOISE FIGURE (dB) | 2.67 |
| IIP2 (dBm) | 66 |
| TB (dBm) | 82 |
| IIP3 (dBm) | -3.3 |
| VOLTAGE GAIN (dB) | 39.2 |
(PRIOR ART)
FIG. 1
(PRIOR ART)
FIG. 2

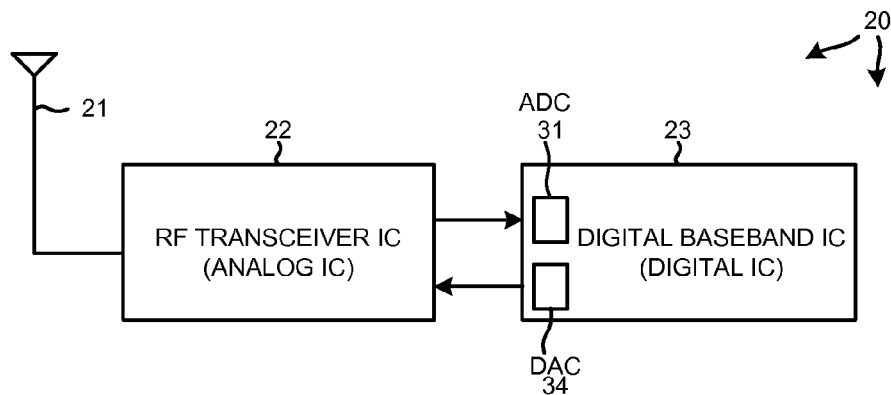
FIG. 3
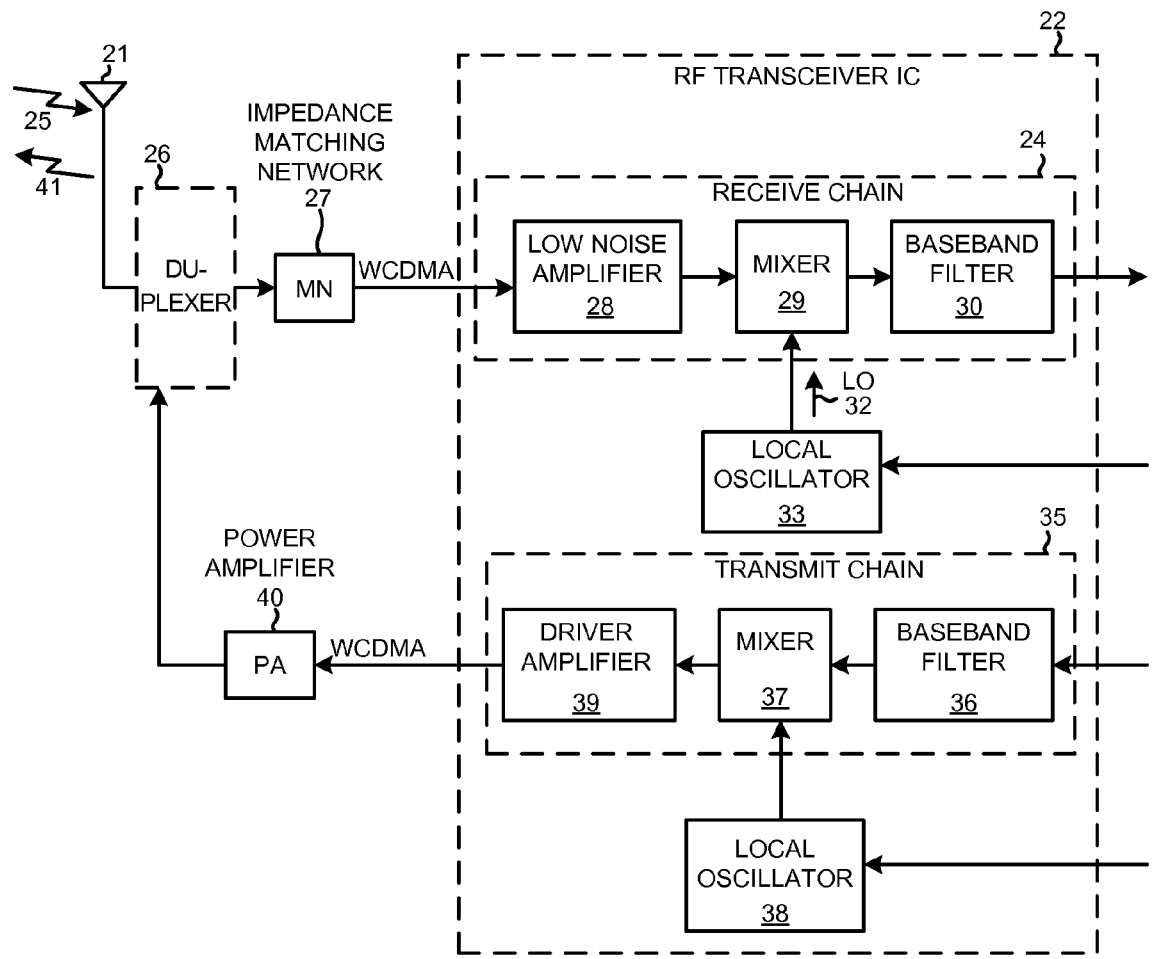
FIG. 4

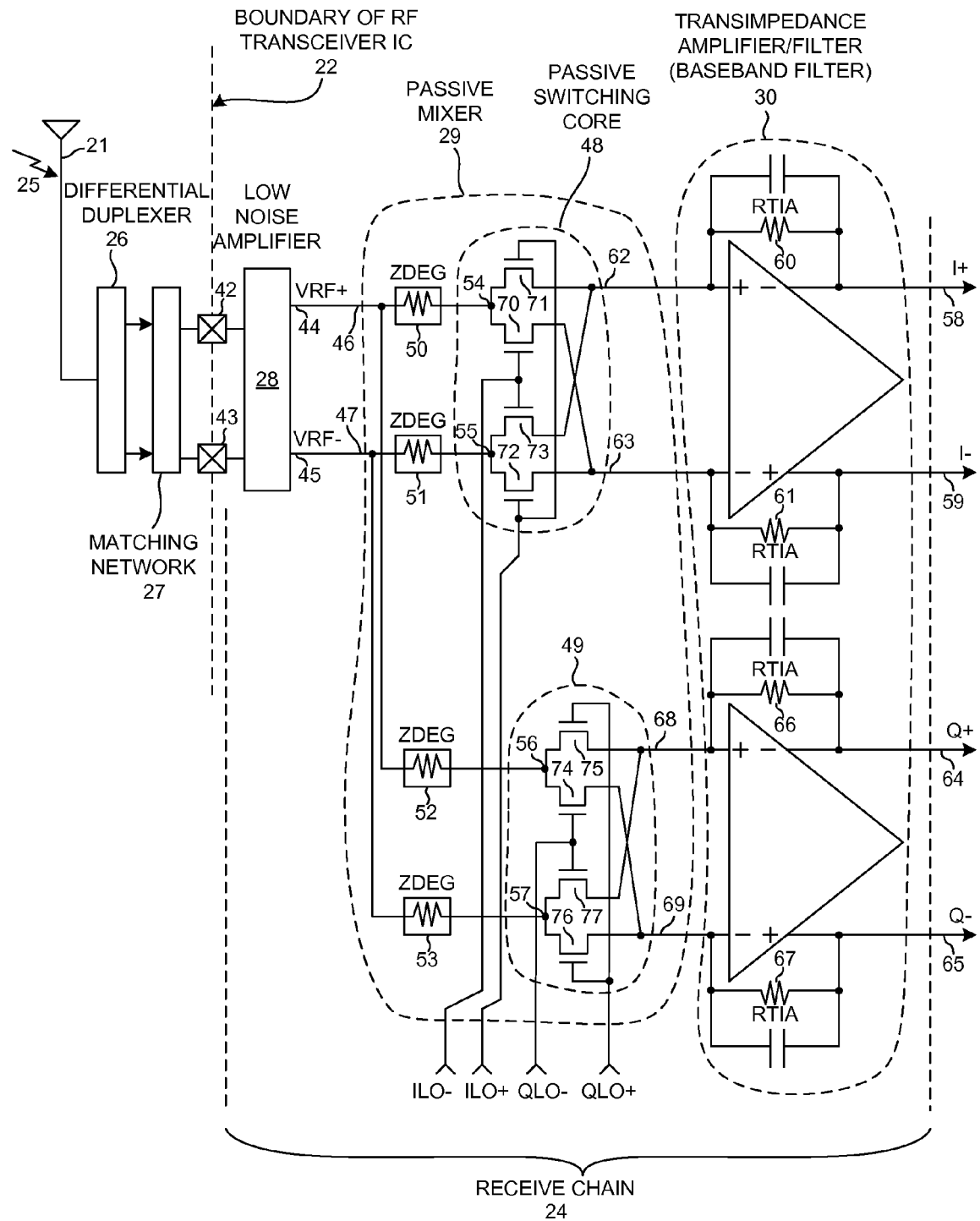
FIG. 5

FIG. 6A $$F_{50\%} \sim \frac{(N_{V\_RX,SRC}\, g^2_{LNA} + N_{I\_LNA,OUT})\,\dfrac{R^2_{LNA}}{(2R_{LNA}+Z_{DEG})^2}\,R^2_{TIA} + N_{V\_ZDEG}\,\dfrac{R^2_{TIA}}{4Z^2_{DEG}} + N_{V\_TIA}\left(1+\dfrac{R_{TIA}}{2Z_{DEG}}\right)^2}{N_{V\_RX,SRC}\, g^2_{LNA}\,\dfrac{R^2_{LNA}}{(2R_{LNA}+Z_{DEG})^2}\,R^2_{TIA}}$$

FIG. 6B $$F_{50\%} \sim 1 + \frac{1}{N_{V\_RX,SRC}\, g^2_{LNA}\, R^2_{LNA}\, R^2_{TIA}} \left( N_{I\_LNA,OUT} R^2_{LNA} R^2_{TIA} + N_{V\_ZDEG} R^2_{TIA}\left(\tfrac{1}{2}+\tfrac{R_{LNA}}{Z_{DEG}}\right)^2 + 4 N_{V\_TIA} R^2_{LNA}\left(1+\tfrac{R_{TIA}}{2Z_{DEG}}\right)^2\left(1+\tfrac{Z_{DEG}}{2R_{LNA}}\right)^2 \right)$$

FIG. 6C $$F_{50\%}(Z_{DEG}) \sim N_{V\_ZDEG}\,\frac{R^2_{TIA}}{4 R^2_{LNA}}\left(\tfrac{1}{2}+\tfrac{R_{LNA}}{Z_{DEG}}\right)^2 + N_{V\_TIA}\left(1+\tfrac{R_{TIA}}{2Z_{DEG}}\right)^2 * \left(1+\tfrac{Z_{DEG}}{2R_{LNA}}\right)^2$$

FIG. 6D $$F_{25\%\_W/O\_I/Q\_OVERLAP} \sim \frac{(N_{V\_RX,SRC}\, g^2_{LNA} + N_{I\_LNA,OUT})\,\dfrac{R^2_{LNA}}{(R_{LNA}+Z_{DEG})^2}\,R^2_{TIA} + N_{V\_ZDEG}\,\dfrac{R^2_{TIA}}{(R_{LNA}+Z_{DEG})^2} + N_{V\_TIA}\left(1+\dfrac{R_{TIA}}{R_{LNA}+Z_{DEG}}\right)^2}{N_{V\_RX,S}\, g^2_{LNA}\,\dfrac{R^2_{LNA}}{(R_{LNA}+Z_{DEG})^2}\,R^2_{TIA}}$$

FIG. 6E $$F_{25\%\_W/O\_I/Q\_OVERLAP}(Z_{DEG}) \sim N_{V\_TIA}\left(1+\tfrac{R_{TIA}}{R_{LNA}+Z_{DEG}}\right)^2 * \left(1+\tfrac{Z_{DEG}}{R_{LNA}}\right)^2$$

FIG. 6F $$F_{25\%\_W/\_I/Q\_OVERLAP}(Z_{DEG})\big|_{A\sim 1,\, B\ll 1} \sim A * F_{25\%\_W/O\_I/Q\_OVERLAP}(Z_{DEG}) + B * F_{50\%}(Z_{DEG})$$

EQUATION FOR NOISE FACTOR AS A FUNCTION OF ZDEG

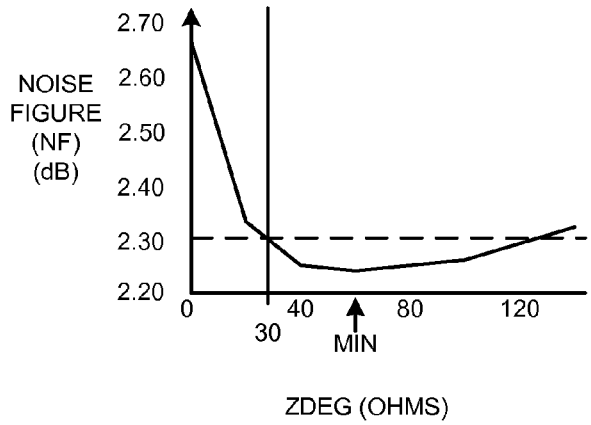
FIG. 7
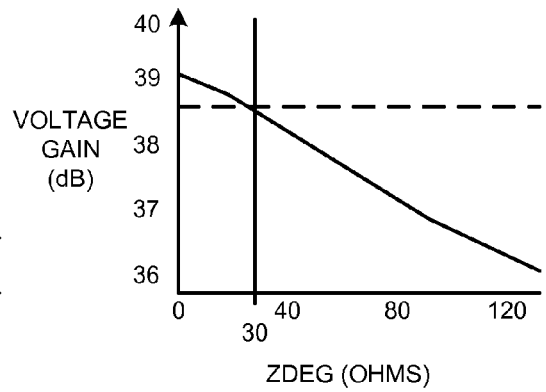
FIG. 8
PROVIDING THE NOVEL DEGENERATIVE
IMPEDANCE ELEMENTS SUBSTANTIALLY
DECREASES NOISE FIGURE
| PERFORMANCE CHARACTERISTIC | VALUE | VALUE |
|---|---|---|
| ZDEG @ OPFREQ (25% LO DUTY CYCLE) | ~0 | 30 OHMS |
| NOISE FIGURE (NF) (dB) | 2.67 | 2.3 |
| IIP2 (dBm) | 66 | 68 |
| TB (dBm) | 82 | 78 |
| IIP3 (dBm) | -3.3 | -3.2 |
| VOLTAGE GAIN (dB) | 39.2 | 38.5 |
FOR:
$R_{LNA}$ (SINGLE SIDED) = 200 OHMS
$R_{TIA}$ = 3K OHMS
OPFREQ = 1.9GHz
PRIOR ART OF FIGURES 1 AND 2
FIGURE 5 WITH NOVEL DEGENERATIVE IMPEDANCE ELEMENTS
FIG. 9

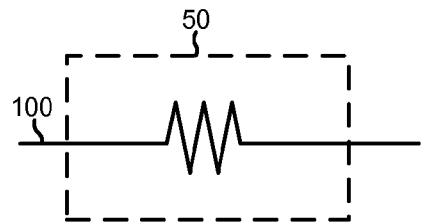
FIG. 10A
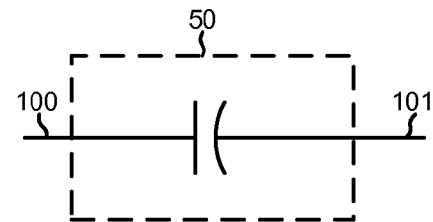
FIG. 10B
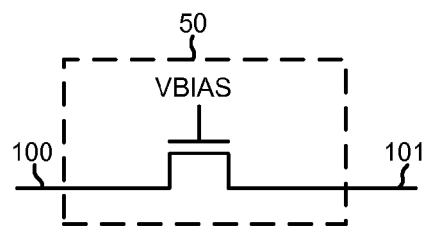
FIG. 10C
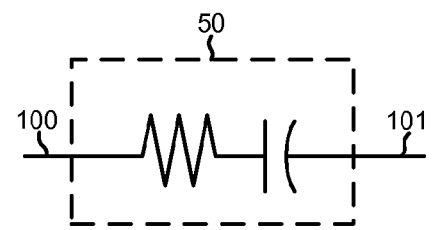
FIG. 10D
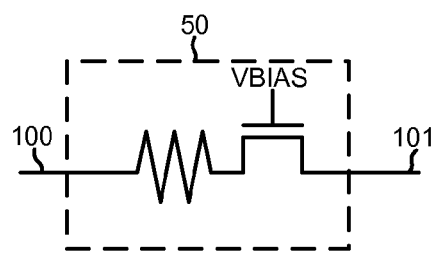
FIG. 10E
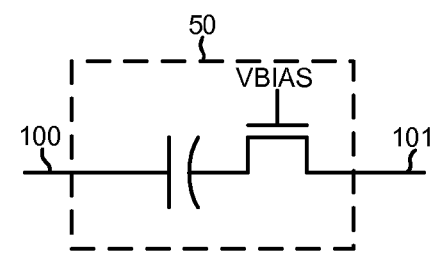
FIG. 10F
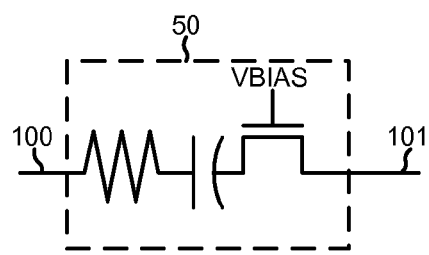
FIG. 10G

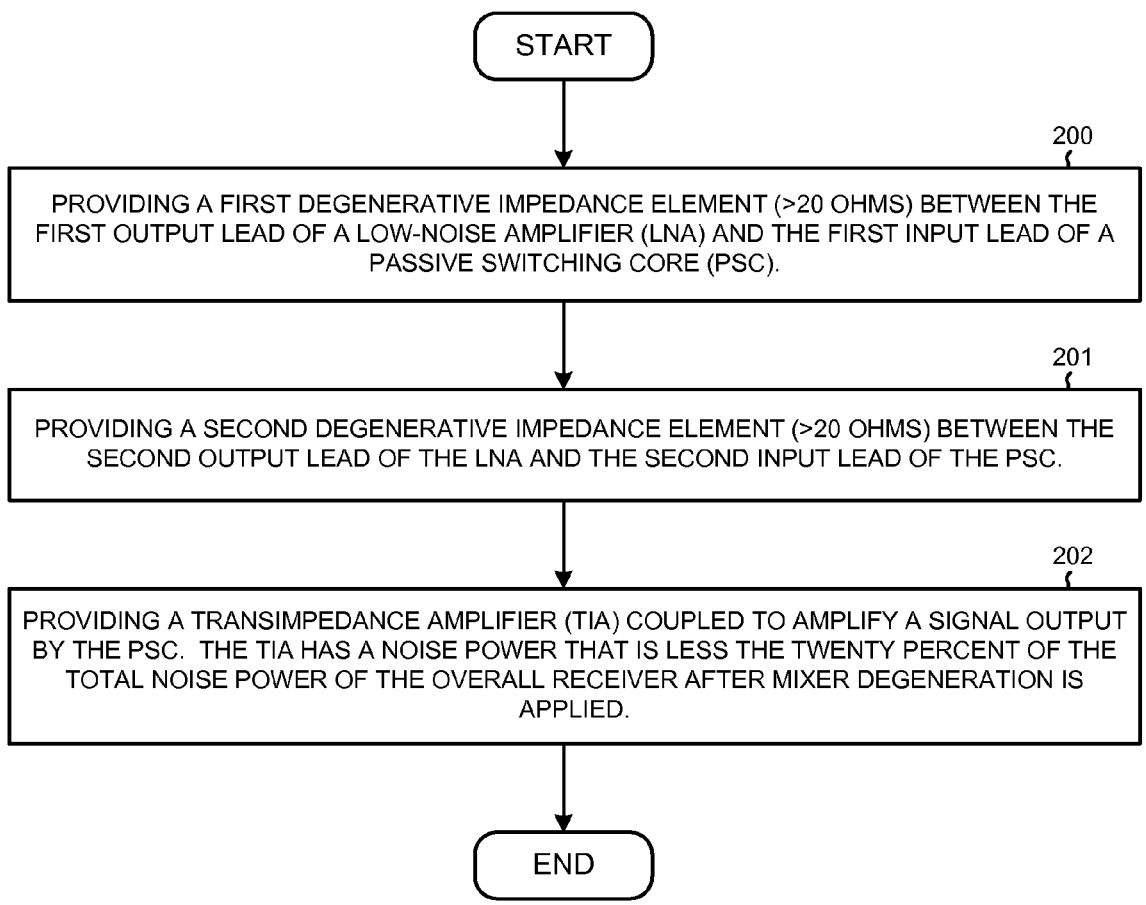
FIG. 11

DEGENERATED PASSIVE MIXER IN SAW-LESS RECEIVER

PRIORITY CLAIMED

This application claims benefit of U.S. Provisional Application No. 60/983,874 titled "DEGENERATED PASSIVE MIXER IN SAW-LESS RECEIVER," filed Oct. 30, 2007, the entire disclosure of this application being considered part of the disclosure of this application.

BACKGROUND INFORMATION

1. Technical Field

The disclosed embodiments relate to low-noise SAW-less receivers having passive mixers.

2. Background Information

There are several different circuit topologies for realizing a cellular telephone receiver. Some topologies involve a surface acoustic-wave (SAW) filter that is disposed in the incoming RF signal path between a low-noise amplifier (LNA) and a mixer. It is desirable to be able to realize a cellular telephone receiver of adequate performance without using the somewhat costly and large SAW device. Other topologies use a high quality and somewhat expensive LNA matching inductor in the matching network between the antenna and LNA. It is also desirable to realize the receiver without using this expensive component, but rather by using less expensive low quality components. In order to achieve good linearity in a SAW-less receiver, a purely passive down-converting mixer is sometimes used. The passive mixer does not have an active gm-cell. It is, however, often difficult for this topology to meet demanding noise figure (NF) requirements while still achieving good linearity (e.g., triple beat) performance.

FIG. 1 (Prior Art) is a diagram of a SAW-less receiver circuit 1 that employs a passive mixer and no active gm-cell. Receiver circuit 1 includes an antenna 2, a differential duplexer 3, an impedance matching network 4, and an integrated circuit 5. Integrated circuit 5 in turn includes an LNA 6, and this LNA is coupled to receive an incoming RF signal from matching network 4 via two terminals 7 and 8. Two differential output leads 9 and 10 of LNA 6 are coupled to the passive mixer 11. The coupling of LNA 6 to mixer 11 may be a capacitive coupling via bypass capacitors having large capacitances that are effective shorts at the frequencies of incoming RF signals.

Passive mixer 11 has two portions. One portion (I-path switching core) supplies a first set of differential signals (I) to a first part of a transimpedance amplifier and filter 12 (I-path TIA). This first part of TIA 12 outputs signals I+ and I− onto output leads 13 and 14. The second portion of passive mixer 11 (Q-path switching core) supplies a second set of Q differential signals to a second part of TIA 12 (Q-path TIA). The second part of TIA 12 outputs the signals Q+ and Q− onto output leads 15 and 16. Unfortunately, it is often difficult to employ the SAW-less passive mixer receiver topology of FIG. 1 and also satisfy stringent noise requirements, while at the same time maintaining good linearity and power consumption performance.

FIG. 2 (Prior Art) is a table that sets forth various performance characteristics of the circuit of FIG. 1. It is desired to reduce the noise figure (NF) of the circuit without providing a high-quality and expensive discrete LNA input matching inductor in the matching network 4 and without increasing the current consumption of LNA 6.

SUMMARY

In a SAW-less cellular telephone receiver involving a passive mixer, novel degenerative impedance elements (Zdeg) having substantial impedances (for example, twenty ohms or more) are disposed in the incoming RF signal paths between the differential signal output leads of a low-noise amplifier (LNA) and the differential signal input leads of the passive mixer. The LNA has a relatively high output impedance (for example, an output impedance of more than three hundred ohms). The passive mixer has no active gm-cell. The passive mixer in turn outputs down-converted signals to a transimpedance amplifier and baseband filter (TIA) of the receiver. Providing the novel degenerative impedance elements decreases noise in the overall receiver as output from the TIA, with only minimal degradation of other receiver performance characteristics such as linearity and voltage gain. Providing the degenerative impedance elements does not unduly increase noise in the TIA. In one example, in which the impedance of each of the degenerative impedance elements is more than twenty ohms, the TIA has a noise power that is less than twenty percent of the total noise power of the overall receiver. The overall receiver has voltage gain of better than 38 decibels (dB) and a triple beat distortion (TB) magnitude of better than 75 dB.

In some examples, the passive mixer receives a plurality of local oscillator signals, where each local oscillator signal has a duty cycle of substantially less than fifty percent. For some portion of the time, none of the transistors in the passive mixer is conductive. In some examples, the novel degenerative impedance elements are programmable to have one of several impedances. The impedance values of the degenerative impedance elements are changed depending on the performance requirements of the particular operating mode in which the cellular telephone is operating or is intended to operate.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

FIG. 1 (Prior Art) is a diagram of one type of conventional SAW-less receiver that includes a passive mixer.

FIG. 2 (Prior Art) is a table that sets forth performance characteristics for the conventional receiver of FIG. 1.

FIG. 3 is a simplified high-level block diagram of a cellular telephone that employs a novel low-noise SAW-less receiver in accordance with one novel aspect.

FIG. 4 is a more detailed diagram of the RF transceiver integrated circuit of FIG. 3.

FIG. 5 is a more detailed diagram of the low noise amplifier (LNA), passive mixer (including the novel degenerative impedance elements), and transimpedance amplifier and filter (TIA) of FIG. 4.

FIGS. 6A-6F set forth a set of equations for determining how changing the impedance values of the novel degenerative impedance elements (Zdeg) changes the noise factor (F) of the receiver of FIG. 5.

FIG. 7 is a graph that shows how changing the impedances of the novel degenerative impedance elements (Zdeg) affects the noise figure (NF) of the receiver of FIG. 5.

FIG. 8 is a graph that shows how changing the value of the impedance of the novel degenerative impedance elements (Zdeg) affects the voltage gain of the receiver of FIG. 5.

FIG. 9 is a table that illustrates how providing the novel degenerative impedance elements (Zdeg) improves the noise figure (NF) of a receiver without severely adversely affecting other performance characteristics.

FIGS. 10A-10G are circuit diagrams of several examples of how the novel degenerative impedance element 50 illustrated in FIG. 5 can be realized.

FIG. 11 is a flowchart of a method in accordance with one novel aspect.

DETAILED DESCRIPTION

FIG. 3 is a very simplified high-level block diagram of one particular type of mobile communication device 20 in accordance with one novel aspect. In this example, mobile communication device 20 is a cellular telephone that uses the WCDMA cellular telephone communication protocol. The cellular telephone includes (among several other parts not illustrated) an antenna 21 and two integrated circuits 22 and 23. Integrated circuit 23 is called a "digital baseband integrated circuit" or a "baseband processor integrated circuit". Integrated circuit 22 is an RF transceiver integrated circuit. RF transceiver integrated circuit 22 is called a "transceiver" because it includes a transmitter as well as a receiver.

FIG. 4 is a more detailed block diagram of the RF transceiver integrated circuit 22 of FIG. 1. The receiver includes what is called a "receive chain" 24 as well as a local oscillator 33. When the cellular telephone is receiving, a high frequency RF signal 25 is received on antenna 21. RF signal 25 in one example is a signal having a frequency greater than one gigahertz. Information from RF signal 25 passes through duplexer 26, impedance matching network 27, and through the receive chain 24. Signal 25 is amplified by low noise amplifier (LNA) 28 and is down-converted in frequency by mixer 29. The resulting down-converted signal is filtered by baseband filter 30 and is passed to the digital baseband integrated circuit 23. An analog-to-digital converter 31 in the digital baseband integrated circuit 23 converts the signal into digital form and the resulting digital information is processed by digital circuitry in the digital baseband integrated circuit 23. The digital baseband integrated circuit 23 tunes the receiver by controlling the frequency of a local oscillator signal (LO) 32 supplied by local oscillator 33 to mixer 29.

If the cellular telephone is transmitting, then information to be transmitted is converted into analog form by a digital-to-analog converter 34 in the digital baseband integrated circuit 23 and is supplied to a "transmit chain" 35. Baseband filter 36 filters out noise due to the digital-to-analog conversion process. Mixer block 37 under control of local oscillator 38 then up-converts the signal into a high frequency signal. Driver amplifier 39 and an external power amplifier 40 amplify the high frequency signal to drive antenna 21 so that a high frequency RF signal 41 is transmitted from antenna 21.

FIG. 5 is a more detailed circuit diagram of receive chain 24. Incoming RF signal 25 received on antenna 21 is coupled through differential duplexer 26 and impedance matching network 27 onto differential input terminals 42 and 43 of integrated circuit 22. LNA 28 amplifies the RF signal 25 and drives differential signals from VRF+ output lead 44 and VRF− output lead 45. VRF+ output lead 44 is coupled to a first differential input lead 46 of passive mixer 29, and VRF− output lead 45 is coupled to a second differential input lead 47 of passive mixer 29. Passive mixer 29 includes no active gm-cell. Passive mixer 29 includes two cross-coupled passive switching cores 48 and 49 and four novel degenerative impedance elements 50-53. First degenerative impedance element 50 has a first lead that is connected to the first output lead 44 of LNA 28, and has a second lead that is connected to a first input lead 54 of first switching core 48. Second degenerative impedance element 51 has a first lead that is connected to the second output lead 45 of LNA 28, and has a second lead that is connected to a second input lead 55 of first switching core 48. Third degenerative impedance element 52 has a first lead that is connected to the first output lead 44 of LNA 28, and has a second lead that is connected to a first input lead 56 of second switching core 49. Fourth degenerative impedance element 53 has a first lead that is connected to the second output lead 45 of LNA 28, and has a second lead that is connected to a second input lead 57 of second switching core 49.

Transimpedance amplifier and baseband filter (TIA) 30 includes a first portion (I-path part of TIA) and a second portion (Q-path part of TIA). The first portion drives a pair of differential signals I+ and I− onto differential output leads 58 and 59. The resistor symbols 60 and 61 represent the feedback impedance RTIA of the first portion of TIA 30. The first portion of TIA 30 receives differential signals from the differential output leads 62 and 63 of first passive switching core 48. Similarly, the second portion of TIA 30 drives a pair of differential signals Q+ and Q− onto differential output leads 64 and 65. The resistor symbols 66 and 67 represent the feedback impedance RTIA of the second portion of TIA 30. The second portion of TIA 30 receives differential signals from the differential output leads 68 and 69 of second passive switching core 49. As indicated by FIG. 5, first passive switching core 48 includes four field effect transistors (FETs) 70-73 and second passive switching core 49 includes FETs 74-77. These FETs are interconnected as illustrated in FIG. 5.

FIGS. 6A through 6F show a set of equations that comprise a derivation of an equation for the noise factor (F) of the circuit of FIG. 5 as a function of the impedance of the novel degradation impedance elements 50-53. The impedance value of each of the degradation impedance elements 50-53 is Zdeg. Noise factor (F) is a measure of degradation of the signal-to-noise ratio (SNR) caused by components in the RF signal chain through the receiver. In the equation of FIG. 6A, the noise factor F is a ratio of the total gross output noise power at the output of the TIA 30 to the contribution of the source's noise power at the output of the TIA 30. The numerator is an expression for the total gross noise power due to all noise sources, where the noise is in the signal bandwidth of the receiver, as these respective noise sources are output from TIA 30. The denominator is an expression for noise power at the receiver output that is due to the source of the receiver.

For each of three noise sources, the noise is referred to the output of the receiver (the output leads of TIA 30). The noise from each noise source is multiplied by the appropriate gain factor to determine how much it contributes to the total noise at the output of TIA 30. The numerator therefore includes three terms, one term for each noise source. The first noise source considered is the source (LNA 28). The second noise source is the degeneration impedance Zdeg. The third noise source is the transimpedance amplifier feedback impedance $R_{TIA}$.

The term Nv_rx,src is the voltage noise density coming from the source in units of $V^2/Hz$. The noise density Nv_rx, src is given by the quantity 4 kTR, where k is Bolzmann's constant, T is degrees Kelvin, and R is the resistance. This noise is noise coming from antenna 21. In this example, the resistance R of antenna 21 is fifty ohms. The term gLNA is the transconductance gain of LNA 28. The term $N_{I\_LNA,OUT}$ is the current density of LNA 28 in units of $Ampere^2/Hz$. The term $R^2_{LNA}/(2R_{LNA}+Zdeg)^2$ is a power split factor that accounts for a power split that takes place between LNA 28 and passive mixer 29. The term $R_{LNA}$ is the single-sided LNA output impedance. The differential LNA output impedance between the output leads of LNA 28 is twice what is referred to here as the single-sided LNA output impedance $R_{LNA}$. The single-sided LNA output impedance $R_{LNA}$ is the impedance as measured from one of the output leads of LNA 28 to ground. In the present example, $R_{LNA}$ (single-sided) is greater than 150 ohms (for example, 200 ohms). Accordingly, the differential LNA impedance is greater than 300 ohms (for example, 400 ohms). The term $N_{V\_ZDEG}$ is the noise density of the degeneration impedance Zdeg. The term $R_{TIA}$ is the feedback resistance (gain factor) of transimpedance amplifier 30.

The 50% notation in the $F_{50\%}$ term indicates that the calculation is for a fifty percent duty cycle of the local oscillator signals ILO+ and ILO−. If the duty cycle were fifty percent, then the signal ILO+ would be active (digital high) for the first fifty percent of the period, and then the signal ILO− would be active for the remaining fifty percent of the period. A 25% notation in a $F_{25\%}$ term would indicate that the calculation is for a twenty-five percent duty cycle of the local oscillator signal. If the duty cycle were twenty-five percent, then the signal ILO+ would be active for a first twenty-five percent of the period, then for the next twenty-five percent of the period neither the ILO+ nor the ILO− signals would be active, then for the next twenty-five percent of the period the ILO− would be active, and then for the final twenty-five percent of the period neither ILO+ nor ILO− would be active. When the TIA is driven by a 50% duty cycle signal, the TIA noise contribution is relatively high, whereas when the TIA is driven by a 25% duty cycle signal, the TIA noise contribution is relatively low.

FIG. 6B is a reorganization of the terms of the equation of FIG. 6A.

FIG. 6C is a further simplification of the equation of FIG. 6B.

FIGS. 6D and 6E set forth equations for determining the noise factor (F) as a function of degenerative impedance for a duty cycle of twenty-five percent. The $F_{25\%\_W/O\_I/Q\_OVERLAP}$ notation indicates that the equation is for a twenty-five percent duty cycle without (W/O) any overlap of the I and Q output signals of mixer 29. Note the differences between the fifty percent duty cycle equation of FIG. 6A and the twenty-five percent duty cycle equation of FIG. 6D in the second and third component terms of the numerator of FIG. 6D. There is a term $(R^2_{TIA}/(R_{LNA}+Zdeg)^2$ that multiplies the value $N_{V\_ZDEG}$. The denominator of this term includes $R_{LNA}$ due to the fact that in a twenty-five percent duty cycle condition, most of the time only one passive switching core is conductive (48 or 49). During this time, the resistance is due to $R_{LNA}$. Note that the corresponding multiplier term in FIG. 6A of $(R^2_{TIA}/Z_{DEG2})$ includes no such $R_{LNA}$ term. This is because in a fifty percent duty cycle condition, both passive switching cores (48 and 49) are simultaneously conductive. Similarly, in the twenty-five percent condition equation of FIG. 6D, there is a term $(1+(R_{TIA}/R_{LNA}+Z_{DEG}))^2$ that multiplies the value $N_{V\_TIA}$. The denominator of this term includes $R_{LNA}$ due to the fact that the duty cycle is a twenty-five percent duty cycle. The corresponding multiplier term in the fifty percent duty cycle equation of FIG. 6A includes no such $R_{LNA}$ term in its denominator.

FIG. 6F is a combination of the noise factor equation of FIG. 6C for a fifty percent duty cycle and the noise factor equation of FIG. 6F for a twenty-five percent duty cycle. There are complications in a real circuit due to a small overlap between I and Q local oscillator signals. The ILO+ and ILO− signals are not actually square waves when each signal is either active or is inactive, but rather the ILO+ and ILO− signals have rise and fall times of non-zero durations. Due to this condition in which one set of transistors is turning off when the other set of transistors is turning on, there is overlap. The resulting overlap is accounted for by the terms A and B in the equation of FIG. 6F. The $F_{25\%\_W/\_I/Q\_OVERLAP}$ notation indicates that the equation is for a twenty-five percent duty cycle with (W/) overlap of the I and Q outputs of the mixer. If ninety-five percent of the time there is no overlap, A is approximately ninety-five percent. B is approximately five percent in that case. Note that in FIGS. 6A through 6F, for the sake of simplifying the equations without losing generality, some powers of 2 and ½ are not shown. The equations also ignore the small on-resistance of the passive mixer transistors and noise from the passive mixer cores 48 and 49 because noise from the cores is only a small noise contributor.

Upon examination of the equation of FIG. 6C, it is noted that the function for noise factor (F as a function of Zdeg) has a minimum. Note that the equation of FIG. 6C involves a left product value and a right product value that are summed together. The term Zdeg is in the denominator of the left product value. Accordingly, for very small values of Zdeg the left product value is extremely large, and consequently the overall noise factor F is also extremely large. In the right product value, the term Zdeg is in the numerator. Accordingly, for very large values of Zdeg the right product value is extremely large, and consequently the overall noise factor F is also extremely large. The minimum value of the noise factor F is for Zdeg values that are neither very large, nor very small. The noise factor value as measured or as determined by the equations of FIGS. 6A-6F is a unitless value. The unitless noise factor value (F) is converted into a noise figure (NF) decibel (dB) value using the relationship NF=10 log F.

It is seen in FIG. 7 that without degeneration, the noise figure (NF) of the receiver is around 2.67 dB. FIG. 7 shows how the noise figure of the receiver of FIG. 5 is improved by increasing the impedance of the degeneration impedance elements 50-53 up to an impedance of approximately sixty ohms for a twenty-five percent LO duty cycle. Thus, with degeneration impedance applied, the noise figure gets better. However, the graph shows that increases in the impedance beyond the optimum noise-figure point begin to degrade the noise figure, which is however still a better result than without degeneration applied. Accordingly, note that the curve in the graph of FIG. 7 has a minimum value of noise figure (NF) for a degenerative impedance Zdeg of sixty ohms, while noise figure is still better than without degeneration applied even for higher values of degenerative impedances.

FIG. 8 is a graph showing how the voltage gain of the receiver of FIG. 5 degrades with increasing degeneration impedance Zdeg.

In accordance with one novel aspect, the degenerative impedance elements 50-53 are provided in a SAW-less receiver that has a purely passive mixer, and the degenerative impedance elements 50-53 are made to have impedances (at the frequency of the incoming RF signal 25) larger than the conventional zero ohm value or very small impedance value of a typical bypass capacitor. Although the graph of FIG. 7 indicates that the optimal noise figure is achieved for a degenerative impedance element impedance values of sixty ohms, in the particular application to which the example of FIG. 7 is put, each of the degeneration impedance elements 50-53 is set to have an impedance of thirty ohms. This impedance is not set higher than thirty ohms in this particular situation because increasing the degeneration impedance above thirty ohms would result in the TB parameter being degraded such that it is too close to a specified triple beat (TB) requirement of the application. The vertical lines at Zdeg values of thirty ohms in FIGS. 7 and 8 indicate the thirty ohm Zdeg value of the specific embodiment of FIG. 5.

FIG. 9 is a table that sets forth a comparison of performance characteristics between the prior art structure of FIG. 1 and the novel receiver of FIG. 5 for a twenty-five percent LO signal. As indicated by the values in the table, adding the degenerative impedance elements 50-53 having Zdeg values of thirty ohms results in a desirable improvement in noise figure from approximately 2.67 dB to approximately 2.3 dB. The values in the table indicate that the noise figure (NF) is improved, without undue degradation of other receiver performance parameters such as the input referred second order intercept point (IIP2), the triple beat component magnitude (TB), the input referred third order intercept point (IIP3), and the voltage gain from the input terminals 42 and 43 of LNA 28 to the output leads 58, 59, 64 and 65 of TIA 30.

In accordance with another novel aspect, the receiver of FIG. 5 is a multi-mode receiver that can support two operating modes. In a first of the two modes, the receiver meets a first performance parameter and uses a smaller value of Zdeg. In a second of the two modes, the receiver meets a second less stringent performance parameter that allows a higher value of Zdeg to be used. A digital control signal is provided whose digital value is indicative of the current operating mode. The digital control signal controls a FET switch that can switch in a second Zdeg impedance in parallel with a first Zdeg impedance. Each of the degenerative impedance elements 50-53 includes two such resistors and one such FET, where the FET allows the overall impedance of the degenerative impedance element to be programmable. If the digital control signal has a first value, then the FET switch is conductive such that the second Zdeg impedance is coupled in parallel with the first Zdeg impedance. The result is a lower value of Zdeg. If, on the other hand, the digital control signal has a second value, then the FET switch is made non-conductive. The second Zdeg impedance is therefore not coupled in parallel with the first Zdeg impedance. The result is a higher value of Zdeg. The higher Zdeg value is used in the second mode when the performance parameter (for example, TB) is less stringent, whereas the lower Zdeg value is used in the first mode when the performance parameter is more stringent.

FIGS. 10A-10G show several examples of how the novel degenerative impedance element Zdeg 50 may be realized. In these examples, the degeneration goes between the LNA and the passive mixer switching core. In each case illustrated, the first lead 100 to the left is the lead of impedance element 50 that is coupled to LNA 28, and the second lead 101 to the right is the lead of impedance element 50 that is coupled to switching core 48.

FIG. 11 is a flowchart of a method in accordance with one novel aspect. In a first step (step 200), a first degenerative impedance element is provided between the first output lead of a low-noise amplifier (LNA) and the first input lead of a first passive switching core (PSC). The impedance of the first degenerative impedance element is greater than twenty ohms. In a second step (step 201), a second degenerative impedance element is provided between the second output lead of the LNA and the first input lead of the first PSC. The impedance of the second degenerative impedance element is greater than twenty ohms. The same holds for the third and fourth degenerative impedance elements and the second PSC. In a third step (step 202), a transimpedance amplifier (TIA) is provided, where the TIA is coupled to amplify a signal output from the PSC. The TIA has a noise power that is less than twenty percent of the total noise power of the overall receiver after the mixer degeneration is applied. The overall receiver in this case is the LNA, the first and second degenerative impedance elements, the PSC and the TIA. Steps 200-202 can be carried out all at once during the semiconductor manufacturing process by which RF transceiver integrated circuit 22 of FIGS. 3 and 4 is fabricated. Steps 200-202 can be carried out all at once by the disposition, delivery and/or sale of RF transceiver integrated circuit 22 of FIGS. 3 and 4. In the example of FIG. 11, after degeneration, the noise contribution from the TIA is lower than 20% of the receiver total output noise. Different combinations of degeneration and TIA noise contribution may be used for different duty cycles. For example, for a 25% LO duty cycle, one may choose a Zdeg of 20 Ohm with a TIA noise contribution of 15% of the total. This will result in an adequate linearity, voltage gain and noise figure requirements. On the other hand, for a 50% LO duty cycle, one may choose a Zdeg of 100 Ohm with a TIA noise of 18%.

Although certain specific embodiments are described above for instructional purposes, the teachings of this patent document have general applicability and are not limited to the specific embodiments described above. Accordingly, various modifications, adaptations, and combinations of the various features of the described specific embodiments can be practiced without departing from the scope of the claims that are set forth below.

What is claimed is:

1. A circuit comprising:
   a low noise amplifier (LNA) having a first output lead and a second output lead;
   a passive switching core (PSC) having a first signal input lead, a second signal input lead, a first signal output lead, a second signal output lead, a first local oscillator input lead, and a second local oscillator input lead;
   a transimpedance amplifier (TIA) having a first input lead, a second input lead, a first output lead, and a second output lead;
   a first degenerative impedance element (Zdeg) having a first lead and a second lead, wherein the first lead of the first Zdeg is coupled to the first output lead of the LNA, and wherein the second lead of the first Zdeg is coupled to the first signal input lead of the PSC; and
   a second degenerative impedance element (Zdeg) having a first lead and a second lead, wherein the first lead of the second Zdeg is coupled to the second output lead of the LNA, and wherein the second lead of the second Zdeg is coupled to the second signal input lead of the PSC, wherein the LNA, the first and second Zdegs, the PSC, and the TIA form a receiver.

2. The circuit of claim 1, wherein the LNA has a differential output impedance of more than three hundred ohms at the frequency of the operating signal.

3. The circuit of claim 2, wherein there is no active gm-cell disposed in a signal path between the first and second output leads of the LNA and the first and second input leads of the PSC.

4. The circuit of claim 3, wherein each of the first Zdeg and the second Zdeg is taken from the group consisting of: a resistor, a capacitor, a transistor, a resistor and a capacitor coupled in series, a resistor and a transistor coupled in series, a capacitor and transistor coupled in series, and a resistor and a capacitor and a transistor all coupled together in series.

5. The circuit of claim 3, wherein the TIA has a filter characteristic and serves as a baseband filter in the receiver.

6. The circuit of claim 3, wherein the frequency of the operating signal is more than four hundred megahertz.

7. The circuit of claim 3, wherein the receiver outputs noise having a total noise power, wherein the TIA has a noise power that is less than twenty percent of the total noise power of the receiver, and wherein each of the first Zdeg and the second Zdeg has an impedance of at least twenty ohms at a frequency of an operating signal being received by the receiver.

8. The circuit of claim 7, wherein the receiver has a noise figure of less than 2.6 dB and a voltage gain of greater than 38 dB.

9. The circuit of claim 3, wherein a first local oscillator signal on the first local oscillator input lead of the PSC is active for less than fifty percent of the time, and wherein a second local oscillator signal on the second local oscillator input lead of the PSC is active for less than fifty percent of the time.

10. The circuit of claim 3, wherein each of the first and second degenerative impedance elements is programmable to have one of a plurality of impedances.

11. The circuit of claim 3, wherein each of the first Zdeg and the second Zdeg has an impedance of at least fifty ohms at the frequency of the operating signal being received by the receiver.

12. The circuit of claim 2, wherein the PSC includes:
a first field effect transistor (FET) having a first terminal coupled to the second lead of the first Zdeg, a second terminal coupled to the first input lead of the TIA, and a third gate terminal coupled to the first local oscillator input lead of the PSC;
a second FET having a first terminal coupled to the second lead of the first Zdeg, a second terminal coupled to the second input lead of the TIA, and a third gate terminal coupled to the second local oscillator input lead of the PSC;
a third FET having a first terminal coupled to the second lead of the second Zdeg, a second terminal coupled to the first input lead of the TIA, and a third gate terminal coupled to receive the second local oscillator input lead of the PSC; and
a fourth FET having a first terminal coupled to the second lead of the second Zdeg, a second terminal coupled to the second input lead of the TIA, and a third gate terminal coupled to receive the first local oscillator input lead of the PSC.

13. A method comprising:
providing a first degenerative impedance element between a first output lead of a low-noise amplifier (LNA) and a first input lead of a passive switching core (PSC), wherein the first degenerative impedance element has an impedance of at least twenty ohms;
providing a second degenerative impedance element between a second output lead of the LNA and a second input lead of the PSC, wherein the second degenerative impedance element has an impedance of at least twenty ohms; and
providing a transimpedance amplifier (TIA) coupled to amplify a signal output by the PSC, wherein the LNA, the first and second degenerative impedance elements, the PSC and the TIA form a receiver.

14. The method of claim 13, wherein the LNA has a differential output impedance of more than three hundred ohms when the receiver is receiving an incoming RF signal of at least four hundred megahertz.

15. The method of claim 13, wherein the receiver outputs noise having a total noise power, wherein the TIA has a noise power that is less than twenty percent of the total noise power of the receiver after degeneration occurs.

16. The method according to claim 15, wherein the receiver has a noise figure of less than 2.6 dB and a voltage gain of greater than 38 dB.

17. The method of claim 13, wherein the receiver further includes a second PSC, two additional degenerative impedance elements coupled to the second PSC, and a second TIA that amplifies a signal output by the second PSC, and wherein the total noise power of the receiver includes noise output from the second TIA.

18. The method according to claim 17, wherein the second TIA has a noise power that is less than twenty percent of the total noise power.

19. The method of claim 13, further comprising:
changing the impedances of the first and second degenerative impedance elements.

20. The method according to claim 13, further comprising switching another degenerative impedance in parallel with said first degenerative impedance.

21. A circuit comprising:
a SAW-less receiver chain having a passive mixer and no active gm-cell, wherein the SAW-less receiver includes a low-noise amplifier (LNA), the passive mixer, and a transimpedance amplifier (TIA) that receives a signal output from the passive mixer; and
means for providing an impedance in a signal path between the LNA and the passive mixer, wherein the impedance is greater than twenty ohms, and wherein the means has no gain.

22. The circuit of claim 21, wherein the means includes a first resistor and a second resistor.

23. The circuit of claim 21, wherein the SAW-less receiver chain and the means are adapted for use in a cellular telephone.

24. The circuit of claim 21, wherein the passive mixer receives a local oscillator (LO) signal that has a duty cycle of substantially less than fifty percent.

25. The circuit of claim 21, wherein the impedance of the means is programmable by changing a digital control signal supplied to the means.

* * * * *